A. BARBER.
PUMP ROD BEARING.
APPLICATION FILED MAY 21, 1918.
1,302,757.
Patented May 6, 1919.
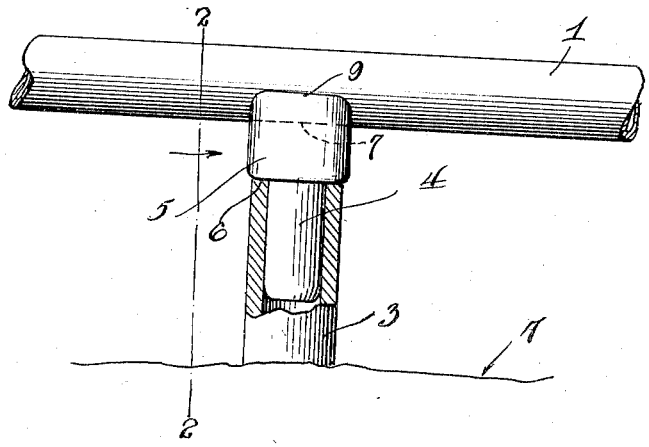
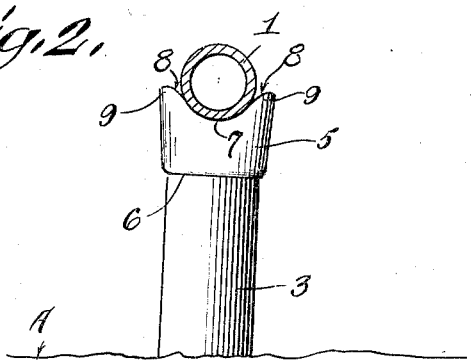
WITNESSES
R. W. Hoagland
Wm. H. Mulligan
INVENTOR
Andrew Barber,
BY Richard Owen.
ATTORNEY

UNITED STATES PATENT OFFICE.

ANDREW BARBER, OF DETROIT, MICHIGAN.

PUMP-ROD BEARING.

1,302,757.  Specification of Letters Patent.  Patented May 6, 1919.

Application filed May 21, 1918. Serial No. 235,882.

*To all whom it may concern:*

Be it known that I, ANDREW BARBER, a citizen of the United States, residing at Detroit, in the county of Wayne and State of Michigan, have invented certain new and useful Improvements in Pump-Rod Bearings, of which the following is a specification.

This invention relates to bearings and more particularly to an improved bearing adapted for use in supporting reciprocating pump rods such as are used in the operation of oil well machinery.

One of the principal objects of the invention is to provide a bearing of this character that will require little lubrication and which will materially reduce the friction between the pump rods and the bearings when the rods are actuated on the bearings.

A further object of the invention is to provide an improved bearing of this character that will obviate the difficulties occasioned by splitting of the bearings as often occurs with the devices now commonly used.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:

Figure 1 is a side elevation, partly in section showing my invention as it appears in use.

Fig. 2 is a section taken on the line 2—2 of Fig. 1.

Referring to the drawings, wherein is illustrated the preferred form of my invention, in which like numerals of reference indicate corresponding parts throughout the several views, the pump rod 1 is shown in comparatively close proximity to the ground surface indicated at A. In the operation of oil well pumps and machinery, the pump rods are so disposed and are adapted to reciprocate to impart the required motion to parts of the machinery to pump the oil from the wells.

To support the pump rods and permit them to freely reciprocate, a length of pipe 3 is provided which has one end extended into the ground to rigidly hold the pipe in upright position. This pipe acts as a standard for the bearing which consists of a cylindrical shank 4 extended into the open end of the pipe and preferably loosely received therein so that it may readily rotate as desired. Integrally formed with the shank 1 is a shoe 5 shaped as shown to advantage in Fig. 2 of the drawing. The bottom of the shoe is slightly larger in diameter than the outside diameter of the pipe thereby providing a shoulder 6 which contacts with the end of the pipe to support the bearing. The shoe and the shank are preferably constructed of glass, porcelain or the like and the top of the shoe is recessed to form the seat 7 within which the pump rod 1 is received. This seat 7 is ground perfectly smooth and the depth of the recess is considerably less than half the diameter of the rod 1, so that sufficient bearing surface is provided to support the rod and prevent lateral displacement from the shoe.

The sides of the recess are curved upwardly and outwardly as indicated at 8 so that the lips 9 thus provided serve to retain sufficient lubricant or grease to keep the seat 7 lubricated so that the pump rod will move smoothly and with a minimum of friction.

The foregoing description and drawing have reference to what may be considered the preferred or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a bearing of the character described, a standard comprising a hollow pipe having one end open and disposed in vertical position, a pump rod, a shank received within the open end of the pipe, in combination with means connected to the shank and resting on the top of the pipe to slidably support the pump rod.

2. In a bearing of the character described, a standard, a shank mounted on the standard and adapted to readily rotate, a pump rod; in combination with means connected to the shank to rotate on the end of the pipe and including a seat for the said pump rod.

In testimony whereof I affix my signature in presence of two witnesses.

ANDREW BARBER.

Witnesses:
V. GIULIANO,
GEORGE S. DONALDSON.

Copies of this patent may be obtained for five cents each, by addressing the "Commissioner of Patents, Washington, D. C."